J. M. SPENCER.
Portable Stock-Feeders.

No. 138,351.   Patented April 29, 1873.

Witnesses:
John Becker
Sedgwick

Inventor:
J. M. Spencer
per ——— Attorneys.

UNITED STATES PATENT OFFICE.

JOSEPH M. SPENCER, OF LA PLATA, MISSOURI.

IMPROVEMENT IN PORTABLE STOCK-FEEDERS.

Specification forming part of Letters Patent No. 138,351, dated April 29, 1873; application filed January 25, 1873.

*To all whom it may concern:*

Figure 2:
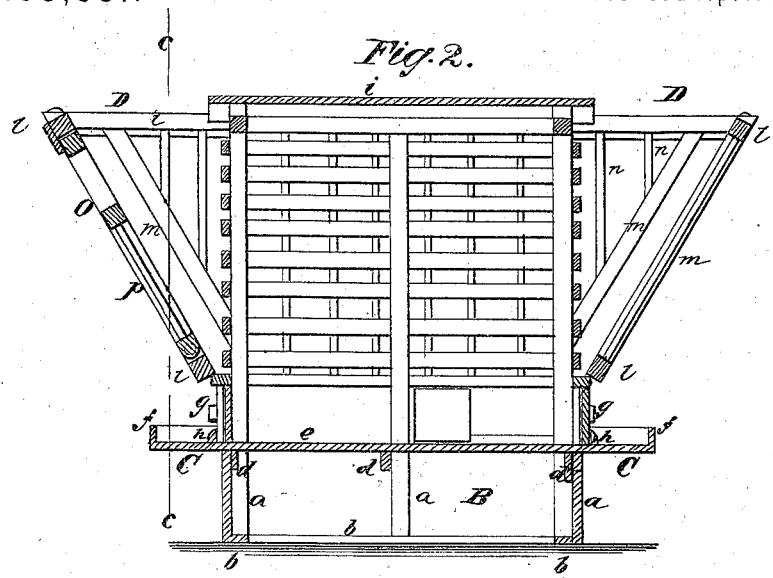
Figure 1:
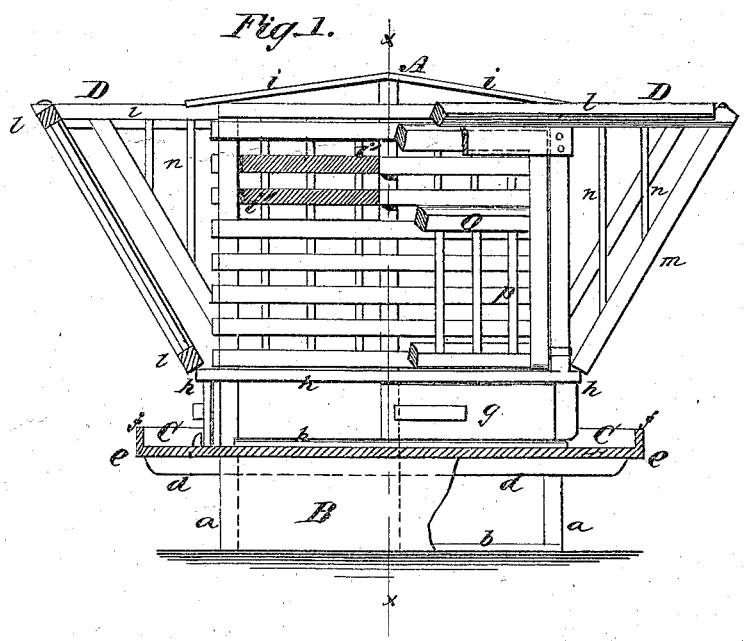

Be it known that I, JOSEPH M. SPENCER, of La Plata, in the county of Macon and State of Missouri, have invented a new and Improved Stock-Feeder, of which the following is a specification:

Figure 1 is a side view of my stock-feeder, partly in section on the line $c$ $c$, Fig. 2. Fig. 2 is a vertical transverse section on the line $x$ $x$, Fig. 1.

Similar letters of reference indicate corresponding parts.

The object of my invention is to supply to farmers and stock-raisers a combined corn-crib, hay-rack, trough, and hog-pen, constructed in a cheap, compendious manner, capable of feeding stock economically and of being easily taken to pieces and removed from one farm or part of a farm to another. The invention consists of a roofed corn-crib with the hog-pen in the lower part. At convenient height is placed the feeding-trough extending around the crib and admitting a large number of animals to feed at the same time. Above the trough, bolted to the crib and also extending around it, is the hay-rack, of the same height as and corresponding in shape to that of the corn-crib.

In the drawing, A represents the corn-crib, which forms the principal part of the structure. The crib may be of square or rectangular shape, and is supported by posts $a$, which are connected by planks $b$ resting on the ground. Joists D projecting over the posts are placed at such height above the ground that this space may be conveniently used as a hog-pen, B, for which purpose three sides are boarded, leaving the fourth open for the admission of the hogs. Planks $e$ are resting crosswise on the joists $d$, and form the floor of the corn-crib, and also the cover of the hog-pen. These planks also project beyond the posts $a$, and are faced by vertically-projecting joint-boards $f$, which form the feeding-trough C.

Shelled oats or ground feed may be fed, as well as corn, but then the planks are required to be well joined to prevent leaking.

The supply of corn from the crib to the trough is regulated by sliding doors $g$, which move in guides $h$. The upper part of the crib is constructed of slats, in the usual manner, placed at interstices, to allow a free circulation of air. The roof $i$ protects the corn against the rain. An opening admits the corn for storage and gradual distribution. Bolted to the main posts $a$, and resting on the upper guide-ribs $h$, is placed, under some convenient angle, the hay-rack D. It is formed of the parallel cross-pieces $l$, the connecting-pieces $m$, and the rack-sticks $n$, which are placed at such distances that the hay is not only safely stored, but easily taken out by the cattle. The cross-pieces $l$ are bolted and dovetailed at their connecting corners, and form a regular self-supporting hay-rack around the crib.

Corresponding with the opening $i'$ of the crib is a section, $p$, of the rack D hinged to the lower cross-piece $l$, in form of a door, which, when opened, gives a convenient access to the corn-crib and hay-rack. For this reason the rack-sticks do not extend to the upper cross-piece $l$, but are shortened and set into the intermediate piece O.

The whole structure may be constructed either entirely of wood, or of wood and iron or other material, and may, by placing it on scantlings, be easily pulled from one part of a farm to some other part.

In case of a larger distance, the different pieces of the stock-feeder may be taken apart, placed on a wagon, and moved to any desirable place, and there easily set up again.

The advantages of this stock-feeder consist not only in its use as a feeder, but also in its availability for storing corn and hay; in the saving effected by the feeder, not only in time, but also in hands; in the prevention of waste, as the hogs make use of feed dropped by the cattle; and in its protection against rats and similar vermin by the hogs under the corn-crib.

In raising and feeding sheep, the hog-house may be dispensed with and the feeder, by lowering the troughs, be made available for the sheep, as well as for other farm-animals.

Having thus described my invention, I claim as new and desire to secure by Letters Patent—

The slatted roofed corn-crib A, having the movable doors $g$, the hog-pen B, the feeding-trough C, and the hay-racks D, all constructed and arranged as described, to form a portable stock-feeder.

JOSEPH M. SPENCER.

Witnesses:
THOMAS M. BELSHE,
BENJ. SHARP.